United States Patent
Andrews

[15] 3,653,459
[45] *Apr. 4, 1972

[54] SURFACE, MATERIAL AND HEALTH PROTECTIVE DEVICE

[72] Inventor: Peter Andrews, 190 Gebhardt Road, Penfield, N.Y. 14526

[ * ] Notice: The portion of the term of this patent subsequent to May 2, 1985, has been disclaimed.

[22] Filed: Oct. 21, 1965

[21] Appl. No.: 508,624

Related U.S. Application Data

[62] Division of Ser. No. 288,159, June 17, 1963, abandoned.

[52] U.S. Cl. ........................................................180/69.1
[51] Int. Cl. ......................................................B62d 25/20
[58] Field of Search ...................180/69.1; 184/100; 195/3 H

[56] References Cited

UNITED STATES PATENTS

| | | | |
|---|---|---|---|
| 1,182,378 | 5/1916 | Jewell | 180/69.1 |
| 1,444,310 | 2/1923 | Fishburn | 180/69.1 |
| 2,742,398 | 4/1956 | Zobell | 195/3 H |
| 2,783,848 | 3/1957 | Beskind | 180/69.1 |
| 2,931,453 | 4/1960 | Inglese | 180/69.1 |
| 3,062,323 | 11/1962 | Oganovic | 189/69.1 UX |

Primary Examiner—Benjamin Hersh
Assistant Examiner—Milton L. Smith

[57] ABSTRACT

A fluid retaining receptacle device which is removably secured to the underside of a motor vehicle by use of hanger means which may be connected to the vehicle by using accessible, bolt securing means, holes, clamping means thereof. The device retains fluid which drips therein from at least one portion of the vehicle. The motor vehicle being a car, truck, bus, racing car and even a boat. A generated draft of air, generated by the forward drive motion of at least one of the vehicles, over and against a portion of the fluid retained in the device and/or in a separate material retained in the receptacle portion of the device, which material may further have organic hydrocarbon consuming bacteria and/or inorganic catalyst means for reducing the volume and/or increasing the rate of oxidation and thickening of the fluid retained therein.

18 Claims, 9 Drawing Figures

SURFACE, MATERIAL AND HEALTH PROTECTIVE DEVICE

DIVISIONAL SPECIFICATION

This is a division of application Ser. No. 288,159, filed June 17, 1963 now abandoned.

This invention relates substantially to a surface or material protective combination device whereby, health is also protected by having cleaner air, safer driving conditions, cost savings, cleaner surfaces, neater appearance of surfaces and the like more fully described in this specification.

This combination device is used in operative association with automotive vehicles to catch and retain the fluid or fluids, which leak or drip from, on or in said vehicle, to prevent the surface or material which is substantially therearound and thereunder the leaking or dripping fluid from becoming a, disgustful sight, polluted, slippery, contaminated or impaired by said fluid. Said device also protects the air from becoming noxious by hydrocarbons which are mostly in petroleum lubricating fluids that are at present leaking from said vehicles. The hydrocarbons oxidize, when exposed to sunlight or when the leaked fluid is thereon a heated surface such as sun heated surfaces of, toll areas, streets, highways, parking areas, or any said vehicle used areas. The air is thereby, being polluted, which also adds to the existing air smog, pollution and the like that is already very undesirable, in various or particular localities, cities, and states.

When a leaking or dripping mineral oil forms a mess or a puddle on a sun-heated surface or material, which is exposed to the sun, the hydrocarbons are oxidized therefrom, making them noxious. Thereby, one of the methods of this invention is having a bed of catalytic chemicals contained in the pan or imbue or imbuement of catalysts into the pan material or the material contained therein, this noxious condition will be greatly reduced or eliminated by retaining and providing for a means for increasing the rate of oxidation and thickening of the fluid therein the device.

Drip pans, trampoline, shelf or hinged trap door and the like devices have previously been constructed to retain oil drippings under automobiles, trucks or busses.

None that I am aware of have secured a device for an inboard-outboard motor boat and other the automotive vehicles. None that I am aware of have attempted to positively retain and oxidize the captured fluid. None that I am aware of have tried to heat the retained fluid to increase its rate of oxidation and thickening of the retained fluid.

One device, captures the leaking fluid and then ejects it onto another portion of a traveled surface, which is just what should not be done and prevented from being done.

The term "automotive vehicle" will hereafter in this specification specifically represent "motor vehicles."

This device is secured, fixed, removably secured, releasably secured, removably fixed or releasably locked, thereto, therein, or thereon said vehicle before or after the fluid or oil start to drip therein, thereon or therefrom.

This device is thereby, securedly associated with or is in secured combination with said vehicle and thereby is considered as being a part of said vehicle, regardless what phase said vehicles are in. The term "phase" is here used to designate the motor vehicles which herein are represented by four classes thereof.

The first class is any motor vehicle having rubber or elastomer, synthetic or natural-tired wheels, which are inflated, semi-solid or solid. Some of these motor vehicles are automobiles, trucks, busses, tractor trucks, factory fork lift trucks, racing cars, tram trucks, trucksters, transport trucks and the like being any, three or more wheeled motor vehicles having said wheels or tires.

The second class of motor vehicle is watercraft.

The third class of motor vehicle is aircraft.

The fourth class of motor vehicle is the type which travels on two rails and another type that travels on a single rail which is supported by trestles.

The device is constructed and arranged so that the flow of air is thereover the inside fluid retentive area, of said device, or thereover, there-through, and thereout the material, cover, screen and the like that is contained inside said device. The device may also be all or partially under and/or removably secured, to at least one portion, under a cross member and the like of the motor vehicle.

The term, "bell housing," is to mean or designate a clutch housing, transmission case, converter case, flywheel case and the like, which is the large dome-like shaped member that is located just back of the motor and in front of the transmission case or gear box or just back of the crankcase of the motor.

Motor vehicles, new or used, and are new or used and which are being transported, may have this invention or device removably secured thereunder to catch fluid which, even later, leaks or drips therefrom.

The device could also be "secured" in and to a watercraft or under and to an element, mechanism, motor, pump and the like, in the said watercraft. Said device or a main portion thereof is thereby, under the fluid which is leaking or dripping from said mechanism or component, in order to at least protect the surface of material thereunder and inside of the watercraft.

The device may also be adapted on the inside of the cabin or fuselage of an aircraft when parked, in storage or in flight, which has a fluid leaking condition therein. The device would thereby be adapted, thereunder the dripping fluid.

The term "fluid" is here used to generally designate an oil or grease, mineral, non-mineral, and synthetic lubricants.

The device can be disposable in whole or in part, as deemed desirable or necessary by the manufacturer, depending on the device, its structure, or its application.

A very important object of this invention or device is to prevent the disclosed surface or material which is under, on, or in, an automotive vehicle, from becoming a disgustful sight, polluted, contaminated or impaired. The device, in being secured under the leaking fluid or fluids, will retain or catch the dripping fluid of which a large portion is oxidized therefrom by the flow or draught of air over the fluid, in the device, when said vehicle is in drive motion.

Another important object of this invention is to increase the rate of oxidation and the thickening of the fluid in the material, which is contained in the receptacle portion of said device, by allowing and providing for a draught of air, which is generated during vehicular drive, to flow over the material. The draught of air will absorb or drive off the fumes which are or may be over the fluid; provide the fluid with oxygen to accelerate fluid oxidation and create a draughty atmosphere over said material, whereby, volatile acids or fluids are also removed, thereby reducing the volume and increasing the thickening or viscosity of the fluid retained therein and thereunder said contained material. This action reduces maintenance cost and increases the fluid retaining life of said contained material and prevents the fluid from spilling, from the device, when said vehicle is steeply inclined or reclined. Said contained material also helps to retain the thickened fluid, which is disposable with said contained material, as may be necessary.

Yet another important object of this invention is to increase the rate of oxidation and thickening of the fluid in the device by catalyzed oxidation and the draught of air over the fluid therein the device. This action supplies the fluid, which is catalyzed, with oxygen to increase the rate of oxidation and thickening of the fluid and also to carry off the fumes which are over said fluid. The force or draught of air will thereby not spill, dump or eject the thickened and oxidized fluid onto the surface or material under the driven vehicle. The spilling, dumping or ejecting action, if allowed to happen, would cause a disgustful sight, pollute, contaminate or impair the surface or material thereunder or the surface onto which the vehicle is in forward drive motion. If the volume or the rate of oxidation and thickening of the fluid was not executed, in the device, then any fast action of starting or abrupt stopping may spill or dump the retained fluid onto the surface under the device. The surface thereunder or the surface or material thereunder, for example, may be a, road, street, highway, driveway, garage floor, toll areas, toll collecting station areas, bridge pavements, factory floors, factory and plant inner streets or roads, manufacturing plant floors and the like would be polluted, contaminated, impaired or create a hazardous slippery surface to travel thereon. If water or other solution were to be retained in the device, along with the dripped in retained oil or fluid therein, then the said solution would be of a greater volume and a thinner consistency, which would still be more easily spilled or dumped therefrom, if the said fluid was not subjected to a draught of air and/or catalyzed oxidation as herein described to thereby help reduce the retained fluid volume.

A still yet another important object of this invention is to provide place or imbue a catalytic chemical or a catalyst into or onto a material, or the material contained in the device, or place a catalytic chemical bed or a catalyst means on the inside of the receptacle surface and thereby be actually under said material, thereby, increasing the rate of oxidation and thickening of the fluid in said material, which is retained in the said device. Said material also is disposable, cleanable, rechargeable with said catalyst, or the like as deemed necessary or desirable. The said spilling, dumping of the fluid would be eliminated and reduction of the fluid volume and thickening thereof would thereby be obtained.

A further object of this invention is to have a bed of catalyst or bed of catalytic chemicals on a stand-off or on part of the device, to oxidize hydrocarbons as they pass past or against said bed, when hydrocarbon fumes are in the draught of air, which is flowing over the device. The catalyst or catalytic chemical bed can also be in the device without any material over or in the device if deemed desirable. The bed of catalyst or catalytic chemicals also will prevent the air from becoming polluted or contaminated by oxidizing the hydrocarbons from the fluid. If the fluid therein was allowed to leak or drip, forming a fluid mess or puddle or allowed to be spilled or dumped onto a hot surface and, thereby, be exposed to the sunlight, the emission of the hydrocarbons therefrom would become noxious, whereby polluting of the air therearound is created.

Another object of this invention is to provide a device which has contained in, the pan or receptacle, a material or a combination of materials, which are characterized by being, absorbent, re-absorbent, absorbent, re-absorbent, or possess retentivity, be osmotic, foam, permeable, fibrous, impermeable, open cell foam, closed cell foam, cellulosic, cellular, foamed, vacular, foamed in place, non-absorbent (plastic, metal, manmade fibers, wiskers, crimped, corrugated, honeycomb, and the like) material, to prevent the accumulated fluid therein from spilling out, being dumped out, or be ejected out of the device and onto the pavement, road, highway, driveway, garage, toll areas, parking areas, streets and the like when the vehicle is stopped or started abruptly or when said vehicle is in fast drive motion, then the flow of air thereover is, draughting, very swiftly or the said air, is deflected directly into the device, but said air will not eject the fluid therefrom and onto a surface below.

A still other object of my invention is to provide a device which is or is the equivalent of a one-piece structure and is adapted to the vehicle in at least one or more places which is of a safe, solid, cheap structure, and at the same time, the securing thereto is accomplished without drilling any holes, adding more supports, or without using any bolts or means for securing the device to the vehicle other than what is presently on or in the vehicle and yet make the device readily removable for maintenance of the vehicle or of the device.

A principle object of this invention is to save money for home owners who have a fluid leaking or dripping automobile, truck, jeep, truckster and the like. When the fluid leaks on the driveway or the garage floor, a puddle of dirty, gooey, sticky fluid is thereon, into which a person or child could step into or a baby could crawl into, thereby the clothing, the shoes, the floor in the house, the rug in the house, and the like, are soiled or impaired. This impairing action is a monetary loss as well as having a child or baby soiled or messy. The device prevents the leaking fluids from creating unsightly dirty spots on paved driveways, or garage floors, on the surfaces of clean public areas, clean private areas, sacred areas, clean commercial area, clean municipal areas, and the like.

Another principal object of this invention is to provide a device whereby neighbors and friends will welcome you to visit them and still be welcomed at another time. If you should visit them and then leave a fluid puddle on the driveway surface, especially if the driveway is in new condition, your neighbor or friends will not welcome you back because of the mess you left behind.

A yet another object of this invention is to retain the present cooling surface of the crankcase. The cooling of the underside outer surface of the crankcase oil pan sump by a draught of air, which is generated during drive, keeps the lubricating fluid, therein, cool and retards the oxidation rate and the thickening of the fluid that is necessary for proper lubrication of the automotive vehicle parts therein.

A yet another important object of this invention is to protect or shield the crankcase oil pan from hot surfaces or pavements thereunder that would thereby add additional heat to the lubricating fluid in said oil pan, and thereby the rate of oxidation and thickening of the said fluid is retarded and proper lubrication is maintained as well as retaining the leaking fluid in the device which is secured to the motor vehicle.

Still another principle object of my invention is to save money for automobile, truck, bus and the like owners, which have a leaky seal at the rear of the engine or in the transmission or in both of them. The cost of a device is only a fraction of the cost to replace the seal in the motor and in the transmission. It will cost from 30 to 45 dollars, for labor, just to replace a 75 cent seal in the automatic transmission alone and the device could be as cheap as 2 or 3 dollars with installation. Thereby you have a savings of at least 10 to one and about a 20 to one savings if the rear engine seal is to be replaced also.

A still further object of this invention is to save money for the state, parking garage owners, cities, towns, federal government and the like by preventing the pollution, contamination, or impairment of the surfaces or material on thruways, bridges, highways, toll collecting areas, collecting stations, gasoline stations, garages, warehouses, storage areas, parking areas, streets, freeways, turnpikes, and the like which are being cleaned with surface improving machines, surface cleaning machines or cleaning with detergents, soaps, and the like. The state alone is presently paying thousands of dollars to clean the thruway areas and toll collecting areas and thereby millions of dollars is saved for all concerned.

Another principle object of this invention is to provide a device, which is secured to the underside of said motor vehicles (the first class thereof) which would thereby prevent the surface of, streets, roads, highways, thruways, toll areas, collecting stations, bridge, vehicle traveled, surface, turnpikes, freeways, and the like, from becoming contaminated by the leaking fluid, which leaks from gasketed, sealed or past shaft seals or joints, and said leaking fluid is contaminating, polluting, and impairing the said traveled surfaces. The said fluid is creating a slippery, dangerous surface onto which vehicular traveling is becoming more and more crowded or conjested. The more crowded or conjested the said traveled surfaces are then the more the damaging fluid leakings are going to be, even more so, a very objectional condition. The traveling conditions are thereby, going to be also compounded, and the appearance of the traveled surfaces even more so are going to be objectionable, not to mention the following safety hazard. Moisture, dew, and especially rain or surface water will, when added to the dripping or leaking fluid slippery surface, raise or lifts a portion of the said slimy leaked fluid onto its surface and thereby tends to spread or float the said fluid even more so, especially from the center portion of the traveled surfaces, where the said fluid contamination and the like, is black with the slimy, slippery mess. The said water thereby, spreads the fluid or oil slick onto the somewhat cleaner portion of the traveled surfaces, and creates an even more dangerous said surface to travel thereonto.

Yet still another principle object of this invention is to prevent an unsightly mess inside a boat, cruiser, ship and the like of the said second class automotive vehicle, having an inboard motor and the like to which this invention device is secured to or thereunder. Said securing being to a portion of the said watercraft or to a portion of a fluid retained or lubricating mechanism or housing, pan, or case or motor portion such as a cross member, bell housing, motor support and the like. The device would thereby, also prevent the rotting of any fluid contacted wood member thereunder, as well as prevent the soiling or impairing of a finished or painted surface thereunder. Slime and the like, which is created by the leaking, slippery fluid, would also be eliminated and would thereby, prevent a slippery dangerous surface in the boat, or the like, for a person to stand or walk thereon.

An additional principle object of this invention is to provide friendly relations between customers and commercial owned, fluid leaking or dripping automotive vehicles (the first class thereof) owners or the drivers thereof. Trucks, insurance men, salesmen and the like, which deliver milk, freight, packages, material, lumber, fuel oil, collect payments, sell goods or material and the like, are not welcomed on any driveway, that is paved or asphalt covered, or on clean streets because they always leave a fluid spot or puddle when they leave. Some customers insist that said leaking vehicles stay off their driveways and make the drivers walk to the house from the street. This situation would never be necessary if the said vehicles were equipped or had a said fluid retaining device, secured to the underside of said vehicles, whereby the leaking fluid would be retained in the pan or receptacle of the device and later be oxidized and thickened therein and still later be disposed with a material contained therein or cleaned therefrom as deemed necessary and desirable or as instructed by the manufacturer when the device should be cleaned or changed.

Still another principle object of this invention is to provide a device which is adapted or removably secured to the underside of racing cars to prevent fluid, which is or which is apt to leak therefrom and onto the surface of a testing course or the surface of a surfaced race car track. The leaking fluid would create a slippery spot, streak or area which would make it very dangerous to test, tryout, time trials or to race thereon. The device could be secured to the underside of the racing automobile vehicle, before the race to retain or catch the leaking fluid if it should start to leak therefrom while the racer was in action on the speedway or track. This device even if secured to the underside of a racing motor vehicle when there is a showing of leaking fluid would thereby eliminate a dangerous slippery surface and also will prevent the racing car from being excluded from the race, which is one of the rules for the 500 mile Memorial Day race at Indianapolis. Fluid spots would also be prevented from being unsightly on the surface of the race pits.

Still another further important object of this invention is to create or bring it to the attention of automotive vehicle (the first class thereof) manufacturers, and city state and federal authorities, that this invention is necessary, useful, needed, and essential so that the device could become standard equipment, auxiliary equipment, optional equipment, optional "extra," or an accessary thereof. Securing brackets, holes, flanges, or a means to secure the device thereto or thereunder would be at least at the discretion of the manufacturer.

A yet another important object of this invention is to increase the rate of oxidation and thickening of the fluid in the device, to prevent the air from becoming polluted, or prevent the surface or material under the vehicle, from becoming unsightly, polluted, contaminated, or impaired, or both of the described reasons by diverting the flow of air down and over the top of the fluid therein, thereby, creating a draughty draught of air over the material in the device, whereby, the fluid is substantially dehydrated. This is accomplished by providing and designing for the said flow of air over, under, and through the material in the device as more fully disclosed in the drawings.

Still another last object of this invention is to have the fluid impermeable receptacle portion of this device have therein a catalyst means for said dripped in fluid and which receptacle has a bezel-like flange, washer or dished top portion with an opening, a hole, holes or a louvered construction in a portion of said cover. Said bezel washer or top is or is not dished down towards the inside bottom wall portion of said receptacle. The said dishing down construction would permit fluid which dripped on said bezel or top surface to drain or flow towards the inside and into said receptacle or into any material which is retained in said receptacle with said catalyst means, if desired. Said bezel or top would greatly increase the fluid retaining capacity of said receptacle when said motor vehicle and device is in an out-of-level position. Some of these positions are assumed when said vehicle is parked, standing, being transported, jacked up and the like. When said vehicle is in out-of-level positions with said device thereon, the fluid retained in said device will have to attain a greater accumulative volume at the device sides and thereby will not flow or leak over the edge of the pan or receptacle portion of the device as easily or quickly. The dripped in fluid will, thereby, be retained in said bezel-like receptacle device to the first exposed edge or open hole in said top. Said receptacle can also be constructed from fluid permeable material, whereby, it is placed in a fluid impermeable boot, which has and places a surrounding bezel-like flange over, said permeable pan or receptacle bezel surface. The first said bezel, washer or cover could also be characterized as having a partial resistance towards fluid impermeability and the like, thereby, being capable of retaining said fluid in said receptacle when the vehicle is in drive motion and being drivedly started, stopped, inclined, reclined, or quickly curving for a short period of time, for example, around a corner and the like, and also when said vehicle is in said parked and like out-of-level positions even for a relatively short time only, then said latter fluid retaining bezeled members may be used as deemed necessary.

The very last object of this invention is to produce a fluid retaining device of the character described which may be produced and used at a minimum of expense and yet assure the highest degree of surface or material sanitation, maintenance and attractiveness that is desired thereupon painted surfaces, traffic lines, parking lines and the like areas used by said motor vehicles. The minimum of expense is further made possible thereby reusing the main structure of said device and having only the material contained in said device or only the catalyzed material contained in a nestable receptacle, which is retained in said device, to be disposable or the nestable receptacle with a material therein to all be disposable. The minimum of expense is still further made possible thereby, having a material in said receptacle that is washable and not disposable but reusable or a nestable receptacle which is reusable and the material contained therein is also washable and reusable. The minimum of expense is further yet made possible, by reducing maintenance costs, by providing an arrangement and use of materials, whereby said device retains compounding portions of dripped in fluid, made possible by increasing the fluid rate of oxidation and thickening therein. The spilling, dumping and out-flowing fluid action is also reduced. The minimum of expense is also still reduced, whereby, accessible bolt means, accessible bore means, accessible securing, accessible attaching, attaching or sliding means or any other accessible securing means which is provided on the automotive vehicle for the sole purpose of permanently securing, removable fixing, removably securing, removably attaching and the like, by an automotive vehicle manufacturer or an individual. Additional cost for said device is saved, by use of, proximate said means also, of said vehicle.

A clear support of terms and phrases used in the claims for or antecedent basis are to also be found in the description of FIGS. from 1 to 9 to the appended drawing and are to be considered as a portion of this remainder of the specification and which also contain descriptive portions to be considered as being contained herein this latter detailed specification description. Description and uses of the four defined classes of the motor Vehicle, the device securing and location thereof, also word and phrase definitions and combinations, all of which are described by definitions in the beginning of this specification are also to be considered as herein this portion of this specification, as would become apparent or obvious to persons skilled in the art and with the above instructions and this complete application before them.

Figures 1, 8, 9:
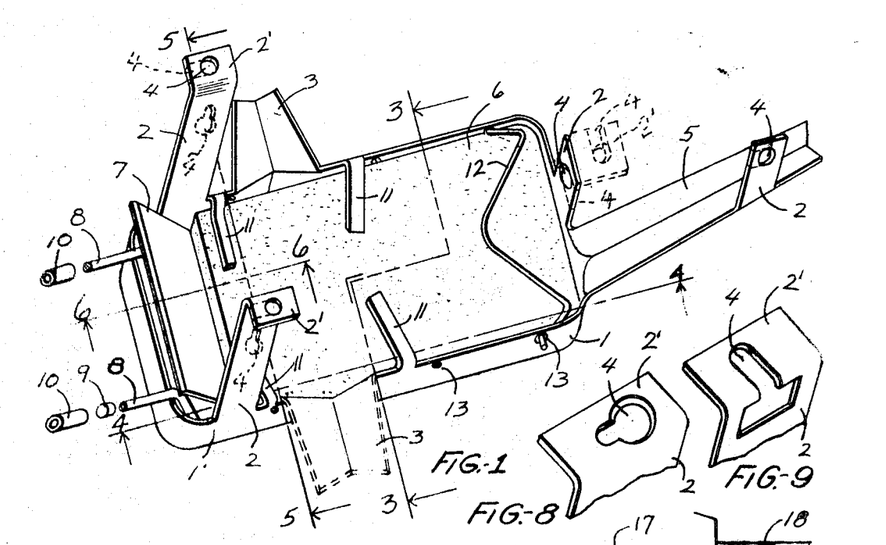
FIG. 1 is an isometric top view of one embodiment of the polygonal, configurated, shaped combination device.
FIG. 8 shows a keyhole opening in hanger free end 2'.
FIG. 9 shows a tee shaped opening in hanger 2 free end.

Referring to the drawing having the FIGS. from 1 to 9, wherein FIG. 1, is a perspective view of one embodiment of the device having a pan or receptacle 1 which is oil resistant and fluid impermeable, and having hangers 2, which are substantially an integral part of the pan or receptacle 1 and which extend upwardly therefrom the integral surrounding sides $1^1$ (one prime), also shown as 1' (one prime) being the same.

It is to be noted here that when the term, "integral," is used it is to emphasize that it is or is substantially a one piece device having the parts fixed together as a rigidly secured single element or part and any hanger, bracket or other member which is removably secured, welded, brazed, riveted, cemented and the like which makes the member rigid and integral-like and/or removable from the receptacle 1, said motor vehicle and the like. It should also be considered as an integral member of said receptacle 1 because the removably secured construction of the hangers and ears would at times be thereby greatly simplified. The device's storage and packaging would thereby be made simpler and more convenient and the material costs for its manufacture also would be saved thereby. This is especially true where the device is made of metal and forming and drawing of the device is necessary. For example, moulding of the device, without the contained material in the receptacle, in one integral piece would be very feasible, whereby material costs and the like would not be excessive and especially if moulded and/or formed or drawn from plastic a material sheet and the like.

It is also to be noted that the term "fluid impermeable" designates that the receptacle, hanger, and the like are also resistant to any fluid which is described in the former portion of this specification, wherein "fluid" is defined and is retained and contained in the receptacle after it leaks or drips from the motor vehicle.

The device of the present invention may be more fully understood by consideration of the appended drawing together with the following description:

In FIG. 1 the hangers 2 are substantially shown as an integral part of the receptacle sides $1^1$ and are upstanding and extend upwardly from, the integral surrounding side $1^1$, which also are integrally connected at all corners of said receptacle. The corners can be square, rounded or any shape it is desired that they are to be when the receptacle is made. That is, for example, in the manufacturing of only the receptacle, the corners are created as desired or deemed necessary. Strength, fluid impermeable, fluid permeable, air flow, appearance, material used, ease of manufacture, nestability, method of manufacture and the like, are some of the reasons for the shape of the corners or any portion of the hanger 2 or receptacle 1, where there is a change of direction, of form or shape of the material used. The hangers 2 are in an upstanding position and two of the hangers 2 are shown having their ends $2^1$ (two prime) at an angle to the hanger 2 and receptacle sides $1^1$. The hangers 2 show openings 4 therethrough for receiving, accessible or available bolt securing means which are on and of the motor vehicle. The accessible bolts (not shown) are said vehicle crankcase flange securing bolts, bell housing bolts, transmission bolts and the like which are accessible and available for removably securing the hanger ends $2^1$ and the hangers 2 as deemed necessary or desirable, or for removably securing the hangers 2 as also found necessary or desirable. Thereby the receptacle 1 is suspendingly disposed under a portion or portions of the motor vehicle. The openings 4 are shown as being slotted, shown in dashed lines in hanger end $2^1$ and in hangers 2 upstanding portion, whereby the accessible vehicle bolts are loosened enough to permit the hanger ends $2^1$ and hangers 2 to be slid in and out from under the heads of the accessible bolts. The round bore, hole or opening 4 as shown in hanger ends $2^1$ and in hangers 2 would require the complete removal from of any of the accessible bolts used and this has always been desired for it is one of the safest removable securing means. The device would not be detached unless the bolts are completely removed or vibrated out of their securing hole. FIG. 1 shows keyhole openings 4 in dashed outline in two of the hangers 2 to show where they could be located if desired. FIG. 8 shows a keyhole opening 4 in end $2^1$ and FIG. 9 shows a tee shaped opening 4 in end $2^1$ of a portion of hanger 2. The keyhole opening 4 in end $2^1$ would also permit the removal of the hangers 2 or ends $2^1$ from said vehicle by only loosening the accessible bolt securing means and slipping the bolt head through the large portion of the keyhole opening 4 and this structure is stronger, for the outer edge of hanger end $2^1$ and edge of hanger 2 is solid and cannot be slid or pushed out from thereunder the head, of an accessible bolt head, if it was slightly loose. FIG. 1 shows a tee-slot opening 4 which has a different advantage in that the end of hanger $2^1$ has more material around the slot-like opening therein and the curved portion of hanger $2^1$ is continued downwardly a short distance before the large portion of the tee-slot opening 4, that is in the hanger 2 portion of the device, is reached thereby. The use of the tee-slot opening 4 thereby having a safer construction because the accessible bolt securing means must be backed off or loosened a substantial amount in order to have the head of the accessible bolt clear the curved portion of the hanger end $2^1$ which ends into the large portion of the tee-shaped opening 4, in the hanger 2. The above described tee-shaped opening 4 is thereby considered as being a somewhat safer construction than the keyhole opening 4 in that the accessible bolt securing means must be accidently vibrated loose a greater amount, whereby hanger 2 must be pushed upwardly to clear the bolt head hooking feature of the curved portion of hanger end $2^1$. The tee shaped opening 4 construction also permits the hanger 2 member to tensioned toward the small hole end and thereby create a still another advantage toward safety and ease of removability because of the flat flexing possibility of the upstanding portions of hanger 2.

FIG. 1 further shows four hangers 2 which are used for removably securing the device thereto and suspendingly disposing it under a previously described, first class motor vehicle, with accessible or available bolt securing means. Two of the hangers 2 are shown with $2^1$ ends thereon and a third hanger 2, located at the rear of the receptacle 1, and is upstanding from the receptacle third side $2^1$. The rear plain hanger 2 also shows, in dashed outline, that an end $2^1$ can also be thereon if deemed necessary or desired. The ends $2^1$, of hangers 2, can also be left off if this type of construction is found to be desirable or deemed necessary and the hangers 2 would all be straight ended. The ends $2^1$ of hanger 2 can also be formed inwardly, opposite to what is shown, if so desired or deemed necessary.

FIG. 1 shows a receptacle 1 which has integral ears 3 projecting outwardly and upwardly at an angle from the receptacle sides $1^1$. The ears 3 can be on both sides or only on one side 1¹, as shown, for troughingly retaining therein the fluid drippings which drip from the automotive vehicle's crankcase breather pipe or from the valve cover breather pipe or both. If two crankcase breather pipes are on the first class automotive vehicle, then both ears 3 as shown, in solid and dashed outline are then used thereunder. FIG. 1 shows a trough-like ear 5 which is integral with receptacle side 1¹ and extends troughingly upwards at an angle and has a tab or hanger 2 which has an opening 4 therein for receiving a transmission accessible bolt securing means. FIG. 1 shows material 6; material retaining wire 12; integral therefrom sides 1¹ are material retaining tabs 11 which are finger manipulated or tool manipulated over material 6; holes or openings 13 for ends of wire 12; forced or generated air deflector 7. The tabs 11 and wire 12 are illustrative only, as shown, and tabs 11 alone can be used for retaining the material 6, or wire 12 means only can be used for retaining material 6, or a combination of tab 11, which is formed as necessary for proper clearance to the underside of the automotive vehicle as shown in FIG. 2, and wire 12 material 6 retaining means.

Figure 2:
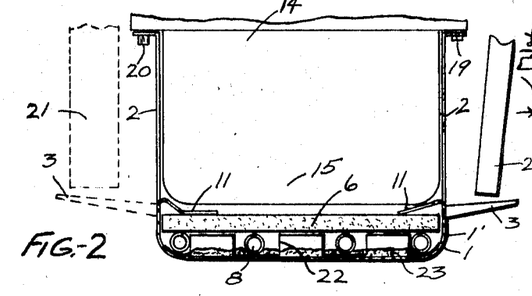
FIG. 2 is a sectional view along line 3—3 of FIG. 1.

FIG. 2 is a sectional view taken along line 3—3 of FIG. 1 and further discloses and shows the device, shown in FIG. 1, suspendingly disposed under a portion of a first class motor vehicle and removably secured by accessible bolt securing means 19 and 20. The bolt means 19 is a conventional hexagon headed bolt which is presently used on most if not all American made cars and the crankcase bolt means 20 is an allen socket headed bolt, but could also be a socket head machine bolt such as a Bristol, Philips, a clutch type, Reed and Prince and the like socket or cross slotted type of head. The described bolt heads 20 permit more viewing space and convenience of removing and insertion of described bolt means for removably securing the hangers 2 to the first class motor vehicle. The allen type head 20 is made of a stronger and tougher material and this type of bolt is preferred over the standard, hexagon, soft and untoughtened bolt 19. The hexagon bolt 19 also leaves only a small space, between the head of the bolt 19 and the outer upstanding surface of hanger 2, because the hanger material thickness reduces the space between the head of the bolt 19 and crankcase 14 wall portion, whereby conventional sockets, for the bolt 19, make it more inconvenient and very hard or impossible to use a standard walled socket for inserting the hexagon headed bolt 19. A thin walled or special thin walled socket is thereby necessary for insertion and removal of bolt 19. The hanger 2 can have the hanger end 2¹ formed toward the crankcase or as other hanger design and structure which is, later, disclosed herein. The bolt 20 being of a tougher and stronger material is important, because the allen headed bolt 20 must removably secure a portion or all of the device and also removably secure the crankcase 14 flange to the motor block. The insertion and removal of the socket head type of bolt 20 is also more feasible and conveniently executed when using a long, allen wrench tipped tool.

FIG. 2 shows the spaced relation of the crankcase oil pan 15, portion of the crankcase 14, and the material 6 and air space around tubing 8 and around and in the corrugated material 22, whereby a generated draught of air, which is generated by the forward drive motion, of the described first class motor vehicle, draughtingly flows into and over and out of the receptacle 1, for increasing the rate of oxidation and thickening of the retained fluid, not shown, in the material 6 and in the receptacle 1. FIG. 2 also shows the upstanding portion of hangers 2 along the outside of crankcase 14 and oil pan 15 and just how the hanger ends 2¹ are removably secured to the crankcase 14 flange or the vehicle.

Figures 3, 4, 5, 6:
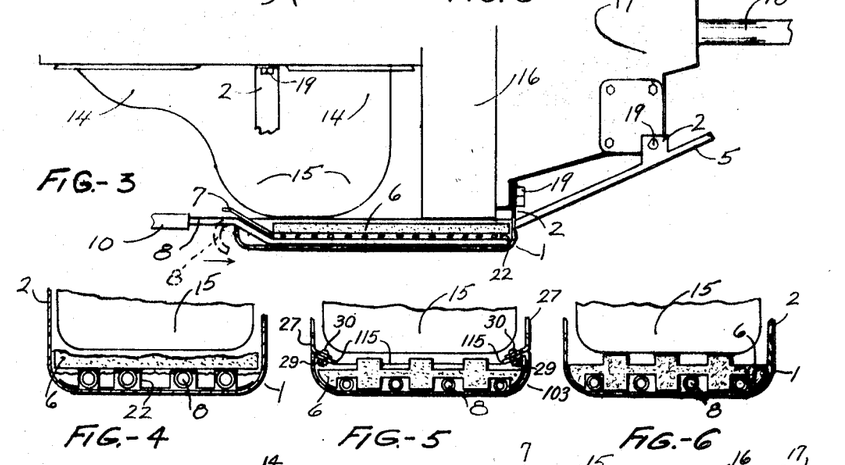
FIG. 3 is a sectional view along line 4—4 of FIG. 1.
FIG. 4 is a sectional view along line 5—5 of FIG. 1.
FIG. 5 is a sectional view along line 5—5 of FIG. 1.
FIG. 6 is a sectional view along line 5—5 of FIG. 1.

FIG. 3 is sectional view taken along line 4—4 of FIG. 1, and how it is mounted to portions of the first class automotive vehicle. Shown is a side view of the crankcase 14 with crankcase oil pan 15 thereon, a portion of the device and bell housing 16, which is defined in the former portion of this specification and is to be considered as being in, this detailed remainder of the specification. Shown is a transmission 17, drive shaft 18, and how the trough ear 5 is located under and past the end of the transmission 17 for capturing and retaining fluid which leaks out of the end of the transmission or other fluid drip-off portions directly thereabove ear 5. The leaking fluid would thereby flow from the ear 5 and partially flow into the receptacle 1. FIG. 3 shows the device being removably secured by accessible or available bolt means 19 of the rear of the transmission 17, bolt means 19 of the transmission 17 mounted flange or bell housing bolt 19 and crankcase removable securing bolts 19 which removably secure hanger end 2¹ to the crankcase flange or to the motor vehicle. FIG. 3 also shows air deflector 7 and its spaced location to the crankcase oil pan 15 forward lower portion thereof. Fluid impermeable receptacle 1, may also have therein a porous material, diatomaceous earth, soil and the like contained in the receptacle 1 of the device, or an oil resistant, fluid impermeable, receptacle which is nested in a receptacle, as first described, or one which is, oil resistant, and fluid permeable and the like, which receptacle and device embodiments will more fully be covered later in this specification.

Figure 7:
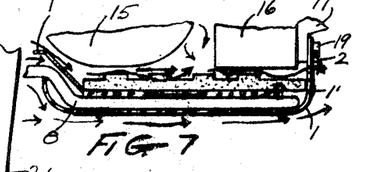
FIG. 7 is a sectional view along line 4—4 of FIG. 1.

The material 6 shown herein is porous and air and fluid permeable, whereby it may also be an air permeable foam material, and also an open cell foam, oil resistant, air permeable material, which is a material which is used for furnace and motor vehicle air filters and the like, and which material is fluid absorbent or fluid non-absorbent and oil resistant, a carpet or plush material having upstanding piles may also be used as disclosed in copending application Ser. No. 532,281 a material made of man-made fluid non-absorbent fiber or metal fibers, a synthetic sponge-like porous material which is used in place of or simulates real sponge (animal) material and comes in various colors from the manufacturers, a curled hair material, having an oil resistant binder such as neoprene or a plastic resin and which binder can be used, if desired, on the manmade fiber material or the metal and the like metal wisker material. The porous open cell foam material is a rigid, semi-rigid, flexible and super-soft foam material as desired or deemed necessary. The material 6 can be adhesive bonded to the inside bottom wall surface of receptacle 1, or to the top surface of the corrugated material 6, if desired, whereby finger 11 and wire 12 would not be used or necessary. FIG. 6 shows the material 6 having a substantially corrugated shape in its top and for bottom surfaces contacting the surface of the crankcase oil pan 15 but a draughting flow of air is still possible, through the tunnel-like opening (not numbered) and through the air permeable material 6, whereby no material 6 adhesive or material 6 retaining means is necessary for the lowest outer underside wall portion of crankcase oil pan sump 15 retains and confines the material 6, in the receptacle 1. FIG. 7 shows the top of material 6 in corrugated form for creating a hurdle draughting effect material 6. The draughting flow of air is thereby hurdely draughting over the material 6 thereby creating a greater air sucking action on the material 6, whereby the rate of oxidation and thickening of the retained fluid, in receptacle and material 6 is increased. FIG. 7 shows flow of draughting air arrows which show the direction of draughting flow of air into the receptacle 1, deflecting and under the receptacle 1, through material 6, through and over the corrugations (hurdles) of material 6, and out of the rear of receptacle 1 and blendingly into the draughting atmosphere. FIG. 7 further shows how deflector 7 and how it deflects and separates a portion of the draughting flow of air into an upper flow through and thereover the top of material 6 and a lower flow into and through the air permeable corrugated tunnel-like at least one opening in material 6 and up through the material 6. This construction thereby creates a very positive draughting flow of air over any retained fluid in receptacle 1 or past any retained fluid, suspended by absorption and the like, in material 6.

This latter portion of this specification contains further descriptive detailed materials, coatings, receptacle and device-retaining means, coatings and the like which may be necessary for a more detailed specification. Fabrics which are woven and non-woven are used for the outside, inside, or core of a fluid retaining receptacle and are to be plastic or elastomer-coated as desired or deemed necessary for creating fluid impermeability. Nylon which is coated with Buna N also makes a good barrier for the retained fluids. Elastomers such as natural rubber, SBR, Polyisoprene, Neoprene, Silicone, Hypalon, Polybutadiene, Butyl, Polyurethane, Nitrile, Polysulfide, Polyacrylate, Fluorocarbon and the like are to be used as desired or deemed necessary for a coating, boot, sleeve, bag, coatings and the like, for the oil resistant and fluid impermeable receptacles which are reusable or disposable and are with or without bezels thereon. The elastomers could have an open cell foam material formed therein if so desired and loose or bonded fibers of hair, man-made metal, and the like and with oil resistant, elastomer or plastic material as a binder.

Strapping of a fluid impermeable or fluid permeable receptacles therein to the hanger 2 supported receptacle 1 structure may be made by use of flat steel, flat fabric, round steel, etc. which are twisted, crimped, spot welded, punch the ends together, metal clips, buckles, and the like. Rope twine, pressure-sensitive tape, reinforced tape, rayon, nylon, and other non-metal materials can be used. A material called Dymax is also very desired or as deemed necessary for it has a molecular structure which is oriented to combine unusually high strength with resilience and it resists oils, greases, and the like, which is very desired. A sta-strap which is installed by hand or with a tool, and called a Sta-Strap Tool is also used, if desired.

A new method of cold fusing metal corners is also to be used if desired or deemed necessary, whereby the receptacle corners are bezeled, spot welded, and then the metal corners are coined into a fluid impermeable and strong joint. This replaces gas welding, and the like of the receptacle corners. The above is an example only and other constructions of coining the corners is possible as well as projection welding, if desired. Thermoplastics and thermosetting plastics are to be used as desired in this invention. Low-pressure laminating and the like are also to be considered, at least, for the receptacle 1. Some of the open-cell foam material which may be retained therein receptacle 1 is made from latex rubber, Polyvinyl, polyether urethane, polyurethane, chloride, polyester, polyepoxies, vinyl, phenolic, polyolefin, silicone, and the like which are or can be rigid or semi-rigid or flexible or super soft and used as desired or deemed necessary, depending upon the material used. A synthetic elastomer or an elastomer sprayed on outer coating or a shell, boat, sleeve, made from the elastomers disclosed above and the like can be used. A coating called Hypalon may also be used if desired or deemed necessary. Since glass fibers are the fastest growing, that is, their applications are almost entirely industrial and are oil resistant and heat resistant whereby their use as a filler in a plastic material for at least the receptacle 1 portion of the device is generally preferred. Other filler materials or fibers which can be used are asbestos, sisal, cotton, jute, man-made and metallic fibers. The resin used for bonding means are preferred to be polyesters but epoxies phenolics and silicones are also to be considered as desired or deemed necessary.

High impact polystyrene coated with an oil resistant coating, high density polyethylene, impact polypropylene, cellulose-acetate-butyrate, acrylonitrite-butadiene-styrene (coated as disclosed) polyester glass-fiber, a thermosetting monomer, and the like are also to be considered for making the receptacle 2 device, if desired or deemed necessary.

Ninety percent of the urban Americans live in localities with polluted air, but only half of all these people are served by local air pollution control programs. It is unmistakably clear that air pollution is associated with important respirator diseases, such as lung cancer, emphysema, chronic bronchitis, and asthma, but progress or no program is effective if not backed by the public, whereby this Surface, Material and Health Protective Device is needed as was disclosed in the objects to this specification and/or invention.

When hydrocarbons, oxides of nitrogen and the like are emitted from the dripped fluid which is thereon a hot, sun-heated surface, or is exposed to the hot sunlight, a photochemical reaction produces irritants and haze. When these by-products are retained in an area by climatic conditions or topographical barriers, the concentration of irritants can produce severe discomfort. The Los Angeles basin has all the necessary ingredients to produce such conditions about 100 days per year.

Hydrocarbon consuming or utilizing bacteria, which are preferred to be aerobic and which utilize the described film or the hydrocarbons therein, for the primary purpose of gaining energy for their life processes in much the same way that higher animals utilize carbohydrates, fats and proteins. The bacteria are characterized by the ability to subsist upon various hydrocarbons as a sole source of organic matter in their diet. Hydrocarbons when utilized in this manner serve the identical purpose that they do when used in an internal combustion engine, the production of utilizable energy with which to do work. Specific catalysts are therein the bacteria and are also found in all living material. These naturally occurring catalysts are called enzymes. Enzymes are catalyst in exactly the same sense as are inorganic catalyst. Enzymes, like other catalyst, do not shift the equilibrium point of a reaction, but only hasten its attainment. The rate of enzyme-catalyzed reactions is approximately doubled for a ten degree (centigrade) rise in temperature, but from an engineering standpoint it is necessary to weigh this factor against the greater rate of destruction of enzymes at higher temperatures. The catalyst can be a fluid or liquid form, or it may be in the form of a sphere, pelleted, tablet, salt, metal soap, minute amounts of a heavy mineral, cylindrical tablets or round rod-like form and the like. The material of the receptacle 1, or the corrugated material 22 may also be a catalyst material for the fluid, which drips from the motor vehicle, such as CR–MO–W steel material and the like. The catalyst material composed of tungsten, may also be the receptacle 1.

The porous material 6 and/or the receptacle 1 having the disclosed bacteria, being an organic catalyst, also has the disclosed inorganic catalyst, which was partly disclosed previously, and still further herenow, whereby a granular, and/or a catalyst which is soluble in the retained fluid. A colloidal solid can be applied on the inside bottom wall portion of receptacle 31 and a catalyst, for the retained fluid, is applied on the colloidal solid, which is not a catalyst carrier. A solution of copper and chromium nitrates can also be imbued in the colloidal solid. The colloidal solid can be microcrystalline of cellulose. Hard alumina (a catalyst) can be bonded on the receptacle 31 inside bottom wall surface and a metal catalyst, for said fluid, or combination of catalyst, for said fluid, in both oxide and halide form can be deposited on the catalyst, for said fluid, alumina base. Metals of colbalt, molybenum, platinum, palladium, ruthenium, iron, chromium, zinc, copper, chrome and the like can also be deposited on the alumina catalyst base. A synthetic silica-alumina catalyst in pellet form can also be used if desired. The alumina catalyst base can also be imbued with a solution of copper and chromium nitrates or pellets of alumina can also be imbued with the copper and chromium nitrates which are placed into the receptacle 1 and 31 as desired.

Chromite catalyst prepared on an alumina or synthetic alumina base and bonded in the receptacle 1, whereby the retained fluid contacting the catalyst and a supply of a draughting flow of air which supplies atmospheric oxygen for the catalytic action whereby the rate of oxidation and thickening of the retained fluid is increased and the fluid volume is decreased. Unsupported catalyst such as copper chromite G-13 and barium-promoted copper chromite G-22 and the like are largely unsupported catalyst, for said fluid and are found in tablet (cylindrical), pellet and the like form.

Catalyst for the oxidation of lubricating oils include a wide variety of compounds, some of which are metal catalyst such as compounds of copper, lead, iron, manganese, chromium, vanadium and the like. Napthenate or iron, copper, lead, silver and cadium can be placed or piped into the retained fluid, and are effective catalysts, especially if the retained fluid is heated to a higher temperature. Exhaust gases range from about 150 F. to 1500 F. and thereby the retained fluid can be heated, with use of tubing 8, to quite a high temperature as desired or deemed necessary within safety margin against smoke and fire formation and the like. A combination of copper, lead, and iron in bulk or soap form can also be contained in the receptacle 1, and the like receptacles. Compounds of manganese, mercury, chromium, calcium, vanadium, nickel and the like catalyst can also be used as a catalyst as well as sodium napthenate and calcium naphthenate. Calcium oleate and manganese oleate can also be used as a catalyst for the retained fluid. Oxidation of the retained oil is also accomplished by placing oleum into the receptacle 1 and the like receptacles (nestable or not). The catalytic oxidation of automotive exhausts, its known process, catalyst and catalyst carriers and the like are to be used herein and finally disclosed at the end of this specification as a possible new use.

The foregoing description and the drawings are given merely to explain and illustrate the invention and is not to be limited thereto, except insofar as the appended claims are so limited.

Having thus described my invention, I claim:

1. A receptacle device in operative association with a motor vehicle having accessible bolt securing means comprising, in combination: a receptacle having hanger means removably secured to said vehicle, said hanger means suspends and disposes said receptacle under said vehicle for receiving and retaining fluid which drips into said receptacle from at least one underpart portion of said vehicle, said receptacle is made of a material which is impermeable by said fluid, said receptacle having a bottom wall and integral rectilinear side and end wall portions which merge integrally at their corner portions and having at least one said hanger means substantially upstanding from and integral with at least one said wall portions, said hanger means having at least one opening through a portion of its upper end for receiving at least one said bolt securing means for removably securing said end to said vehicle, said receptacle having a substantially porous material retained therein and said material having at least one portion of its top surface in spaced relation to at least one portion of the lowest underside outer surface of at least one oil pan of said vehicle and hydrocarbon consuming bacteria is substantially retained in said porous material for further decreasing the volume of said fluid, said device is so constructed and arranged in removably secured combination with said vehicle that said fluid is retained in said receptacle up to an upper edge of said wall portions and when said vehicle is in forward drive motion a generated draft of air flows substantially over a forward wall portion and against said fluid and against at least one underside lowest portion of said oil pan and out over a rear wall portion of said receptacle for indirectly cooling the lubricating oil in said oil pan and for increasing the rate of oxidation and thickening of said fluid retained in said material and in said receptacle.

2. A receptacle device in operative association with a motor vehicle having accessible bolt securing means comprising, in combination: a receptacle having hanger means removably secured to said vehicle, said hanger means suspends and disposes said receptacle under said vehicle for receiving and retaining fluid which drips into said receptacle from at least one underpart portion of said vehicle, said receptacle is made of a material which is impermeable by said fluid, said receptacle having a bottom wall and integral rectilinear side and end wall portions which merge integrally at their corner portions and having at least one said hanger means substantially upstanding from and integral with at least one said wall portions, said hanger means having at least one opening through a portion of its upper end for receiving at least one said bolt securing means for removably securing said end to said vehicle, said receptacle having a substantially porous material retained therein and said material having at least one portion of its top surface in spaced relation to at least one portion of the lowest underside outer surface of at least one oil pan of said vehicle and said porous material having aerobic hydrocarbon consuming bacteria retained therein, said device is so constructed and arranged in removably secured combination with said vehicle that said fluid is retained in said receptacle up to an upper edge of said wall portions and when said vehicle is in forward drive motion a generated draft of air flows substantially over a forward wall portion and against said fluid and against at least one underside lowest portion of said oil pan and out over a rear wall portion of said receptacle for indirectly cooling the lubricating oil in said oil pan and for increasing the rate of oxidation and thickening of said fluid retained in said material and in said receptacle.

3. A receptacle device in operative association with a motor vehicle having accessible bolt securing means comprising, in combination: a receptacle having hanger means removably secured to said vehicle, said hanger means suspends and disposes said receptacle under said vehicle for receiving and retaining fluid which drips into said receptacle from at least one underpart portion of said vehicle, said receptacle is made of a material which is impermeable by said fluid, said receptacle having a bottom wall and integral rectilinear side and end wall portions which merge integrally at their corner portions and having at least one said hanger means substantially upstanding from and integral with at least one said wall portions, said hanger means having at least one opening through a portion of its upper end for receiving at least one said bolt securing means for removably securing said end to said vehicle, said receptacle having a substantially porous material retained therein and said material having at least one portion of its top surface in spaced relation to at least one portion of the lowest underside outer surface of at least one oil pan of said vehicle and said receptacle having therein a catalyst means for further increasing the rate of oxidation and thickening of said fluid, said device is so constructed and arranged in removably secured combination with said vehicle that said fluid is retained in said receptacle up to an upper edge of said wall portions and when said vehicle is in forward drive motion a generated draft of air flows substantially over a forward wall portion and against said fluid and against at least one underside lowest portion of said oil pan and out over a rear wall portion of said receptacle for indirectly cooling the lubricating oil in said oil pan and for increasing the rate of oxidation and thickening of said fluid retained in said material and in said receptacle.

4. A receptacle device in operative association with a motor vehicle having accessible bolt securing means comprising, in combination: a fluid impermeable receptacle having a bottom wall portion and rectilinear side and end wall portions that merge into corner portions which integrally connect adjacent side portions together and at least one of said wall portions having at least one integral dished trough-like ear projecting at an upward angle therefrom and said ear is disposed under at least one portion of the transmission housing and extension end of said vehicle for receiving fluid which drips into said ear from said transmission and said extension end and thereafter generally flows into said receptacle, said ear having at least one integral tab-like ear which has at least one opening therethrough for receiving at least one said bolt securing means for removably securing said ear to said vehicle and at least one said wall portions having at least one integral portion extend upwardly for constituting at least one integral hanger means, said hanger means suspendingly disposes said receptacle under said vehicle and the upper free end of said hanger means having at least one opening therethrough for receiving at least one said bolt securing means for removably securing said hanger end to said vehicle, said receptacle having a substantially porous material retained therein, said material having at least one portion of its top surface in spaced relation to at least one underside portion of said vehicle, said receptacle device is so constructed, arranged and securely disposed under said vehicle that said fluid is retained in said receptacle to an upper edge of said wall portions and the rate of oxidation and thickening of said retained fluid is increased by having a generated draft of air over said spaced relation of said material when said vehicle is in forward drive motion.

5. The combination according to claim 4 wherein said receptacle having a catalyst means for further increasing the rate of oxidation and thickening of said fluid retained in said material and in said receptacle.

6. The combination according to claim 4 wherein at least two of said wall portions each having at least one said integral hanger means, said integral hanger means and said hanger free ends are generally rectilinear, said hanger free ends are formed over at an angle to said hanger sides, said formed over ends having at least one opening therethrough for receiving at least one said bolt securing means of the crankcase oil pan flange for removably securing said formed over ends to said flange.

7. The combination according to claim 4 wherein said draught of air is generally arid and said porous material having aerobic hydrocarbon consuming bacteria therein for further reducing the volume of said retained fluid.

8. The combination according to claim 4 wherein said hangers having their said integral lower end portion removably secured by bolt and nut means to said wall portions, said porous material being readily air permeable, said device is so constructed and arranged that said bolt securing means which removably secure said hanger upper ends to said vehicle are not distrubed for removal and replacement of said receptacle and a generated draft of air through said material will further increase the rate of oxidation and thickening of said fluid in said material and in said receptacle.

9. The combination according to claim 6, wherein said receptacle having one integral flange of an angle bracket integrally secured to at least one said wall portion and the lower integral portion of said hanger being removably secured by bolt and nut means to a second integral free flange portion of said bracket, said receptacle is made of a fluid impermeable material which is itself a catalyst means for increasing the rate of oxidation and thickening of said retained fluid.

10. The combination according to claim 6 wherein said hanger means having at least two openings through its upper free end and said bolt securing means is inserted through at least one said hanger openings for adjustably suspending and disposing said receptacle under at least one portion of said vehicle.

11. The combination according to claim 6, wherein said upper free end of said hanger means are weldingly secured to a portion of said vehicle and said receptacle is removably secured by bolt and nut means to the lower free hanging end of said hanger means, said porous material having a honeycombed structure with the open ends of said structure facing upwardly towards said vehicle.

12. The combination according to claim 6 wherein each said side wall portion having at least one said hanger means, said hanger means having its upper free end weldingly secured to at least one portion of the crankcase oil pan, said receptacle is removably secured to the lower free end of said hanger means by bolt and nut means, said porous material having a structure which is an open cell foam material.

13. The combination according to claim 6 wherein said hanger extends upwardly from at least two said wall portions, said porous material having at least one portion of its top surface in spaced relation under at least one portion of the lowest underside portion of the crankcase oil pan, said receptacle having an inorganic catalyst means for increasing the rate of oxidation and thickening of said fluid, said catalyst means is imbued into at least one inside surface of said receptacle.

14. The combination according to claim 6, wherein said receptacle is suspendingly disposed under at least one portion of the bell housing, said porous material is fluid absorbent and at least one portion of a combination of catalyst means for further increasing the rate of oxidation and thickening of said fluid in said material, said device is so constructed, arranged and removably secured to said vehicle that it is not necessary to remove even one portion of said device when a lubricating oil pan drain plug is removed and replaced.

15. A receptacle device in operative association with a motor vehicle having accessible bolt securing means comprising, in combination: a fluid impermeable receptacle having a bottom wall and integral rectilinear side and end wall portions which merge integrally at their corner portions and having the uppermost portions of said wall portions surroundingly merge integrally into an integral bezel-like inwardly formed flange, said receptacle having a substantially porous material retained therein, said receptacle having at least one integral and upstanding hanger means having at least one opening through its upper free end portion for receiving at least one said bolt securing means for removably securing said free end to said vehicle, said receptacle is suspendingly disposed under the bell housing and is substantially trough-like shaped and having its length positioned substantially 90° to said vehicle forward drive motion, said receptacle having therein a catalyst means for increasing the rate of oxidation and thickening of said fluid, said receptacle device is so constructed and arranged that said hanger means suspendingly disposes said receptacle under at least one portion of said bell housing of said vehicle for retaining said fluid in said receptacle generally above the inside edge of said flange especially when said vehicle is substantially in an out of level position and when said vehicle is started, stopped and curving abruptly in drive motion and that the crankcase oil pan drain plug and the transmission oil drain plug may be removed without the removal of any portion of said device from said vehicle.

16. A receptacle device in operative association with a motor vehicle having accessible bolt securing means comprising, in combination: a receptacle having hanger means removably secured to said vehicle, said hanger means suspends and disposes said receptacle under said vehicle for receiving and retaining fluid which drips into said receptacle from at least one underpart portion of said vehicle, said receptacle is made of a material which is impermeable by said fluid, said receptacle having a bottom wall and integral rectilinear side and end wall portions which merge integrally at their corner portions and having at least one said hanger means substantially upstanding from and integral with at least one said wall portions, said hanger means having at least one opening through a portion of its upper end for receiving at least one said bolt securing means for removably securing said end to said vehicle, said receptacle having a substantially porous material retained therein and said material having at least one portion of its top surface in spaced relation to at least one portion of the lowest underside outer surface of at least one oil pan of said vehicle and said receptacle having therein a catalyst carrier, said carrier having an inorganic catalyst means for further increasing the rate of oxidation and thickening of said fluid, said device is so constructed and arranged in removably secured combination with said vehicle that said fluid is retained in said receptacle up to an upper edge of said wall portions and when said vehicle is in forward drive motion a generated draft of air flows substantially over a forward wall portion and against said fluid and against at least one underside lowest portion of said oil pan and out over a rear wall portion of said receptacle for indirectly cooling the lubricating oil in said oil pan and for increasing the rate of oxidation and thickening of said fluid retained in said material and in said receptacle.

17. A receptacle device in operative association with a motor vehicle having accessible bolt securing means comprising, in combination: a receptacle having hanger means removably secured to said vehicle, said hanger means suspends and disposes said receptacle under said vehicle for receiving and retaining fluid which drips into said receptacle from at least one underpart portion of said vehicle, said receptacle is made of a material which is impermeable by said fluid, said receptacle haVing a bottom wall and integral rectilinear side and end wall portions which merge integrally at their corner portions and having at least one said hanger means substantially upstanding from and integral with at least one said wall portions, said hanger means having at least one opening through a portion of its upper end for receiving at least one said bolt securing means for removably securing said end to said vehicle, said receptacle having a substantially porous material retained therein and said material having at least one portion of its top surface in spaced relation to at least one portion of the lowest underside outer surface of at least one oil pan of said vehicle, said porous material having at least one tunnel-like corrugated opening in at least one of its surfaces for receiving a draughting flow of air therethrough, said material is so constructed and arranged that the rate of oxidation and thickening of said fluid is further increased and said device is so constructed and arranged in removably secured combination with said vehicle that said fluid is retained in said receptacle up to an upper edge of said wall portions and when said vehicle is in forward drive motion a generated draft of air flows substantially over a forward wall portion and against said fluid and against at least one underside lowest portion of said oil pan and out over a rear wall portion of said receptacle for indirectly cooling the lubricating oil in said oil pan and for increasing the rate of oxidation and thickening of said fluid retained in said material and in said receptacle.

18. A receptacle device in operative association with a motor vehicle having accessible bolt securing means comprising, in combination: a receptacle having hanger means removably secured to said vehicle, said hanger means suspends and disposes said receptacle under said vehicle for receiving and retaining fluid which drips into said receptacle from at least one underpart portion of said vehicle, said receptacle is made of a material which is impermeable by said fluid, said receptacle having a bottom wall and integral rectilinear side and end wall portions which merge integrally at their corner portions and having at least one said hanger means substantially upstanding from and integral with at least one said wall portions, said hanger means having at least one opening through a portion of its upper end for receiving at least one said bolt securing means for removably securing said end to said vehicle, said receptacle having a substantially porous material retained therein and said material having at least one portion of its top surface in spaced relation to at least one portion of the lowest underside outer surface of at least one oil pan of said vehicle, said porous material is a porous based carpet material having integral upstanding pile members, said device is so constructed and arranged that said pile members act as a wick upon said fluid retained in said carpet material, and when said generated draft of air flows over and through at least one portion of said pile members the rate of oxidation and thickening of said fluid is further increased and said device is so constructed and arranged in removably secured combination with said vehicle that said fluid is retained in said receptacle up to an upper edge of said wall portions and when said vehicle is in forward drive motion a generated draft of air flows substantially over a forward wall portion and against said fluid and against at least one underside lowest portion of said oil pan and out over a rear wall portion of said receptacle for indirectly cooling the lubricating oil in said oil pan and for increasing the rate of oxidation and thickening of said fluid retained in said material and in said receptacle.

* * * * *